United States Patent
Willgert

(10) Patent No.: US 10,668,545 B2
(45) Date of Patent: Jun. 2, 2020

(54) POWER EQUIPMENT WITH INERTIA BASED MEASUREMENT AND GUIDANCE

(71) Applicant: HUSQVARNA AB, Huskvarna (SE)

(72) Inventor: Mikael Willgert, Spånga (SE)

(73) Assignee: Husqvarna AB, Huskvarna (SE)

( * ) Notice: Subject to any disclaimer, the term of this patent is extended or adjusted under 35 U.S.C. 154(b) by 541 days.

(21) Appl. No.: 14/763,177

(22) PCT Filed: Jan. 30, 2014

(86) PCT No.: PCT/US2014/013799
§ 371 (c)(1),
(2) Date: Jul. 24, 2015

(87) PCT Pub. No.: WO2014/120898
PCT Pub. Date: Aug. 7, 2014

(65) Prior Publication Data
US 2015/0360305 A1 Dec. 17, 2015

Related U.S. Application Data

(60) Provisional application No. 61/759,508, filed on Feb. 1, 2013.

(51) Int. Cl.
B23D 59/00 (2006.01)
B27B 17/00 (2006.01)
B25F 5/00 (2006.01)

(52) U.S. Cl.
CPC ......... B23D 59/001 (2013.01); B23D 59/002 (2013.01); B25F 5/00 (2013.01); B27B 17/00 (2013.01); B27B 17/0025 (2013.01)

(58) Field of Classification Search
CPC ... Y10T 83/62; Y10T 83/707; Y10T 83/7076; Y10T 83/909; B26D 59/001;
(Continued)

(56) References Cited

U.S. PATENT DOCUMENTS 3,097,571 A 7/1963 Kaman
3,744,301 A 7/1973 Arave
(Continued)

FOREIGN PATENT DOCUMENTS

CN 102029586 A 4/2011
CN 102785233 A 11/2012
(Continued)

OTHER PUBLICATIONS

"Pressure Distribution Measurement Over Chain Saw Handles by the Application of a New Capacitive Matrix", 2002, http://www.bice.rm.cnr.it/TESTIVIBRAZIONI/5.P603-1_USA_2002.pdf, all enclosed pages cited.
(Continued)

*Primary Examiner* — Phong H Nguyen
(74) *Attorney, Agent, or Firm* — Burr & Forman LLP

(57) ABSTRACT

An outdoor power tool may include an engine, a working assembly that performs a cutting operation powered by the engine, movement sensor circuitry configured to at least determine movement information of the outdoor power tool using inertia based measurements locally determined at the outdoor power tool, and a position monitoring module including processing circuitry configured to receive the movement information and receive an input defining a reference point. The position monitoring module may be further configured to provide feedback to an operator of the outdoor power tool to direct operation of the outdoor power tool based on the movement information.

16 Claims, 4 Drawing Sheets

(58) Field of Classification Search
CPC .... B26D 59/002; B26D 57/02; B26D 57/023; B25F 5/00; B27L 317/00; B27L 317/0025; B27B 17/00; B27B 17/0025
See application file for complete search history.

(56) References Cited

U.S. PATENT DOCUMENTS

| | | | |
|---|---|---|---|
| 4,499,739 | A | 2/1985 | Matsuoka et al. |
| 5,428,966 | A | 7/1995 | Alsenz |
| 5,904,049 | A | 5/1999 | Jaster et al. |
| 6,021,854 | A | 2/2000 | Scarola |
| 6,330,503 | B1* | 12/2001 | Sharp .................. E01C 23/163 173/1 |
| 7,182,148 | B1 | 2/2007 | Szeiff |
| 7,664,679 | B2 | 2/2010 | Stefanik et al. |
| 7,828,077 | B1 | 11/2010 | Miller et al. |
| 8,049,636 | B2 | 11/2011 | Buckingham et al. |
| 8,360,166 | B2 | 1/2013 | Iimura et al. |
| 2004/0181951 | A1 | 9/2004 | Wittke |
| 2005/0167130 | A1 | 8/2005 | Setter et al. |
| 2006/0049920 | A1* | 3/2006 | Sadler .................. G06F 1/1626 340/407.1 |
| 2009/0062804 | A1* | 3/2009 | Runquist ................ E21B 7/046 606/80 |
| 2009/0236387 | A1 | 9/2009 | Simonelli et al. |
| 2009/0251330 | A1 | 10/2009 | Gerold et al. |
| 2010/0064532 | A1* | 3/2010 | Wittke ................ B27G 19/003 30/382 |
| 2010/0257743 | A1 | 10/2010 | George |
| 2011/0186319 | A1 | 8/2011 | Pellenc |
| 2011/0197458 | A1* | 8/2011 | Karrar .................. B23D 59/002 30/383 |
| 2012/0000682 | A1 | 1/2012 | Grazioli |
| 2013/0193891 | A1 | 8/2013 | Wood et al. |
| 2014/0165946 | A1 | 6/2014 | Yanagihara et al. |
| 2014/0263535 | A1 | 9/2014 | Rajani et al. |

FOREIGN PATENT DOCUMENTS

| | | |
|---|---|---|
| DE | 102009040436 A1 | 3/2011 |
| DE | 102010007714 B3 | 6/2011 |
| EP | 0148102 A3 | 6/1986 |
| EP | 2402122 A2 | 1/2012 |
| JP | H06124119 A | 5/1994 |
| JP | 2002034870 A | 2/2002 |
| JP | 2010075472 A | 4/2010 |
| JP | 2011041621 A | 3/2011 |
| JP | 2012024189 A | 2/2012 |
| JP | 2012055462 A | 3/2012 |
| WO | 2011086745 A1 | 7/2011 |

OTHER PUBLICATIONS

"The Vibration Exposure of Small Horticultural Tools and Its Reduction", 2010, http://phd.lib.uni-corvinus.hu/496/2/laszlo_helga_ten.pdf, all enclosed pages cited.

International Search Report and Written Opinion for International Application No. PCT/US2014/031799 dated Aug. 22, 2014.

International Search Report and Written Opinion for International Application No. PCT/EP2014/059185 dated Jan. 29, 2015.

International Preliminary Report on Patentability for International Application No. PCT/US2014/031799 dated Sep. 29, 2015.

International Preliminary Report on Patentability for International Application No. PCT/EP2014/059185 dated Nov. 8, 2016.

* cited by examiner

POWER EQUIPMENT WITH INERTIA BASED MEASUREMENT AND GUIDANCE

TECHNICAL FIELD

Example embodiments generally relate to outdoor power equipment and, more particularly, relate to outdoor power equipment devices that employ inertia based measurement and guidance techniques.

BACKGROUND

Outdoor power equipment includes such devices as mowers, trimmers, edgers, chainsaws and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, even though these devices are often primarily constructed with a balance between mobility and robustness in mind so that they can engage in hard work in hostile environments, they are still sometimes called upon to perform precision work. For example, such devices may be asked to make precise cuts having straight edges or specific lengths. In the past, operator skill and/or the operator's ability to utilize externally available tools have been the determining factors in the ability to generate specifically detailed work product. For example, the operator may have been required to make separate measurements using a tape measure in combination with a keen eye and steady hand to employ precision cuts. For obtaining straight trimming lines, some operators may use a horizontally strained string as a guide.

More recently, larger devices have been able to employ guidance features that are driven, for example, by the use of global positioning systems (GPS). GPS guidance may be employed in connection with large agricultural equipment such as tractors, or even some lawn tractors, in order to guide operators relative to performing some precision tasks. However, commercially available GPS does not provide sufficient accuracy to enable an operator to generate precise work product in the context of smaller pieces of equipment, where the measurements are confined to small areas or where the work product requires small tolerances.

Accordingly, there may be a desire to provide improved methods of providing measurement and guidance for outdoor power equipment.

BRIEF SUMMARY OF SOME EXAMPLES

Some example embodiments may therefore provide power equipment that employs inertia based measurement and guidance. The use of inertia based sensors to assist in providing guidance or measurement can allow power equipment to generate work product in a relatively precise way or to relatively precise specifications.

In one example embodiment, an outdoor power tool is provided. The outdoor power tool may include an engine, a working assembly that performs a cutting operation powered by the engine, movement sensor circuitry configured to at least determine movement information of the outdoor power tool using inertia based measurements locally determined at the outdoor power tool, and a position monitoring module including processing circuitry configured to receive the movement information and receive an input defining a reference point. The position monitoring module may be further configured to provide feedback to an operator of the outdoor power tool to direct operation of the outdoor power tool based on the movement information.

In another example embodiment, a method of providing feedback for operation of an outdoor power tool is provided. The method may include receiving movement information indicative of movement of the outdoor power tool using inertia based measurements locally determined at the outdoor power tool, receiving an input defining a reference point, and providing feedback to an operator of the outdoor power tool to direct operation of the outdoor power tool based on the movement information.

Some example embodiments may provide an operator of an outdoor power tool with a relatively easy way to make measurements and guided cuts without using additional tools or equipment beyond that which is provided with or integrated in the outdoor power tool itself.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
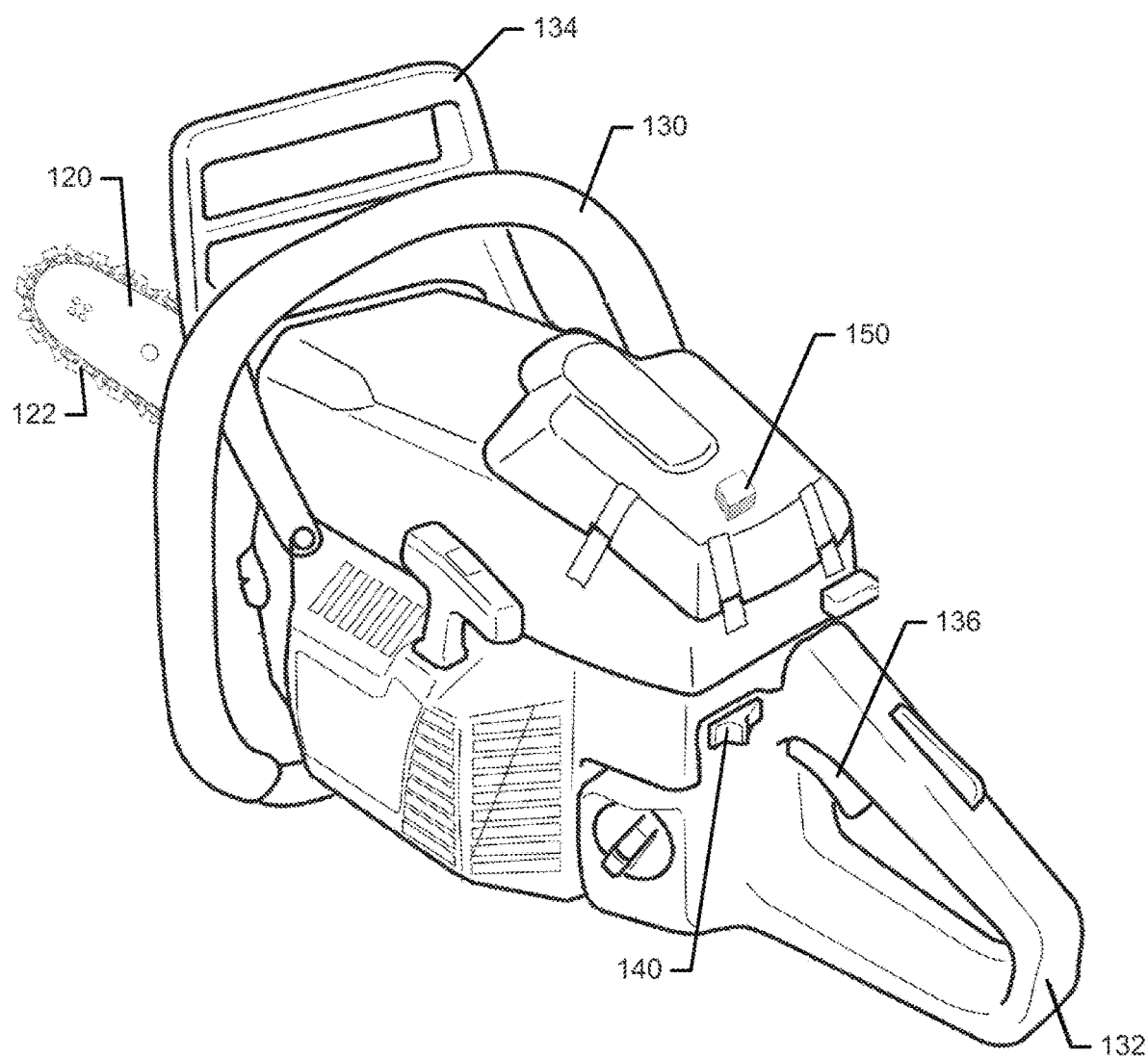
FIG. 1 illustrates a perspective view of a chainsaw according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a movement sensor assembly that may be employed on any of a number of different pieces of outdoor power equipment. The movement sensor assembly may employ inertia based measurement and/or guidance associated with the use of accelerometers, gyroscopes or other similar movement detecting devices. Distance measurements and guided movement may therefore be conducted without the use of external measuring or guiding devices. By employing movement sensors based on inertia, a relatively simple and accurate measurement and guidance method may be provided to enable, for example, chainsaws to cut pieces of lumber to an accurate length without pausing to employ measuring equipment. Trimmers may trim vegetation to a consistent height without employing external devices for assistance. Edgers or mowers may be enabled to cut in a straight line without the use of external guides. Other precision related work product may also be provided.

FIG. 1 illustrates a perspective view of a chainsaw 100 according to an example embodiment. It should be appreciated that the chainsaw 100 of FIG. 1 merely represents one example of power equipment on which an example embodiment may be employed. Thus, alternative embodiments may also be employed on other devices such as, for example, mowers, trimmers, edgers and/or the like. The chainsaw 100 is therefore only presented as one, non-limiting example for which some of the functionality achievable by example embodiments will be described.

Referring to FIG. 1, the chainsaw 100 may include a housing 110 inside which a power unit or motor (not shown) is housed. In some embodiments, the power unit may be either an electric motor or an internal combustion engine. The chainsaw 100 may further include a guide bar 120 that is attached to housing 110 along one side thereof. A chain 122 may be driven around the guide bar 120 responsive to operation of the power unit in order to enable the chainsaw 100 to cut lumber or other work pieces.

The chainsaw 100 may include a front handle 130 and a rear handle 132. A chain brake and front hand guard 134 may be positioned forward of the front handle 130 to stop the movement of the chain 122 in the event of a kickback. The rear handle 132 may include a throttle control 136 to facilitate control of the power unit. In some embodiments, a measurement trigger 140 may be provided on or proximate to a portion of the rear handle 132. However, the measurement trigger 140 could alternatively be provided at any other conveniently accessible portion of the housing 110. The housing 110 may also host a feedback indicator 150. In this example, the feedback indicator 150 is provided on a top portion of the housing 110 so as to be visible to the operator while the chainsaw 100 is in use. However, the feedback indicator 150 could be provided at any suitable location, and could be provided audibly or even tactilely, so that it is not necessary that the feedback indicator 150 be visible in all instances.

The measurement trigger 140 of this example embodiment is provided as a button that the operator may access relatively easily with the thumb of the hand that grips the rear handle 132. Thus, for example, the operator may be enabled to provide an input by actuating or depressing the measurement trigger 140 at an appropriate time as described herein. However, it should be appreciated that the measurement trigger 140 could take other forms and be located in other locations. Moreover, in some embodiments, the measurement trigger 140 may not be embodied as a physical component. Instead, for example, the measurement trigger 140 may be actuated responsive to detection of specific actions or activity patterns that are known to correlate to a specific behavior or action. When the specific actions or activity patterns associated with a certain desired behavior or action that is associated with triggering a corresponding activity are detected, a functional entity embodied in software within the chainsaw 100 may be triggered in order to act as the measurement trigger.

In an example embodiment, both the feedback indicator 150 and the measurement trigger 140 may be configured to communicate with onboard electronics or control circuitry of the chainsaw 100. The onboard electronics of the chainsaw 100 may be relatively rudimentary in some embodiments, relatively sophisticated in others, or anywhere in between. In some embodiments, the onboard electronics may be limited to interaction with local components of the chainsaw 100. However, in some alternative embodiments, the onboard electronics may be configured to enable communication with external devices or networks.

Figure 2:
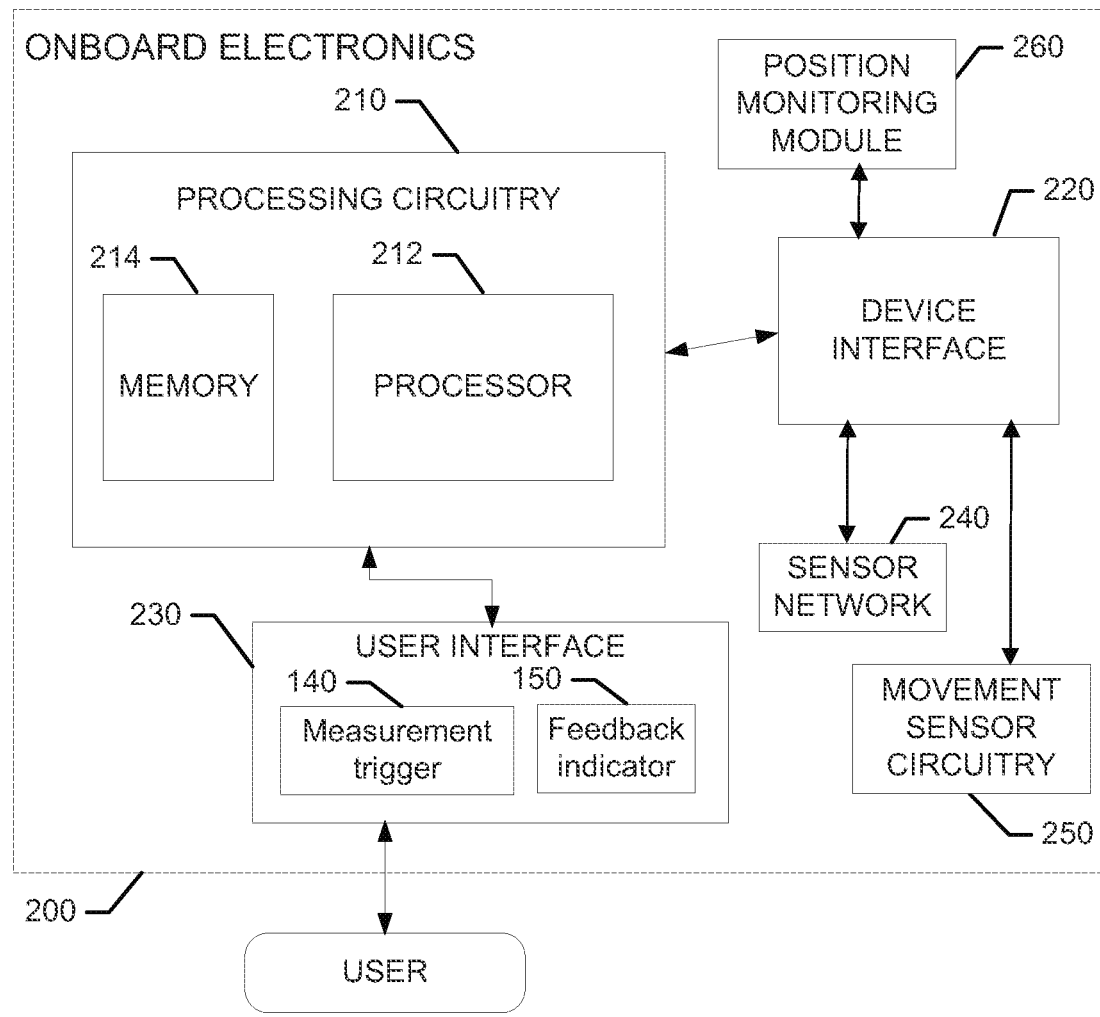
FIG. 2 illustrates a block diagram of one example of onboard electronics that may be used in connection with employment of an example embodiment on the chainsaw or any other power equipment that may employ an example embodiment.

FIG. 2 illustrates a block diagram of one example of onboard electronics that may be used in connection with employment of an example embodiment on the chainsaw 100 or any other power equipment that may employ an example embodiment. As shown in FIG. 2, the onboard electronics 200 may include processing circuitry 210 of an example embodiment as described herein. In this regard, for example, the onboard electronics 200 may utilize the processing circuitry 210 to provide electronic control inputs to one or more functional units of the chainsaw 100 and to process data generated by the one or more functional units regarding various operational parameters relating to the chainsaw 100. In some cases, the processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of a sensor network 240 (e.g., sensors that measure variable values related to chainsaw parameters like RPM, and/or the like) of the chainsaw 100 via the device interface 220. In one embodiment, part of the sensor network 240, or at least a component or assembly of components with which the processing circuitry 210 may communicate, may include movement sensor circuitry 250. The movement sensor circuitry 250 may include, control and/or otherwise interface with movement sensors such as one or more accelerometers and/or gyroscopes. In some cases, the movement sensor circuitry 250 may further include GPS capability. However, GPS capability is not required and may be excluded in some embodiments.

The movement sensor circuitry 250 may be configured to provide indications of movement of the chainsaw 100 based on data provided by the one or more accelerometers and/or gyroscopes. In other words, the movement sensor circuitry 250 may be configured to detect movement of the chainsaw 100 based on inertia-related measurements. The indications may be provided to a position monitoring module 260. The position monitoring module 260 may be configured to receive indications of movement and track movement of the chainsaw 100 relative to a reference point to provide feedback to the operator based on the tracked movement. In an example embodiment, the position monitoring module 260 may include positioning capability via inclusion of a global positioning system (GPS) sensor, an assisted global positioning system (A-GPS) sensor, a differential GPS sensor, UWB, inertial sensors or vision based position tracking techniques. Moreover, in some embodiments, the position monitoring module 260 may utilize a carrier wave signal (e.g., the carrier associated with GPS satellite transmissions) in order to employ real time kinematic (RTK) satellite navigation techniques. RTK-GPS may employ phase measurements of the carrier wave (without regard for the content of such signals) in order to improve the accuracy of GPS positioning by employing carrier-phase enhancement. The position monitoring module 260 may include an electronic compass, a horizon sensor, a gravity sensor, an accelerometer, a gyroscope, a magnetometer and/or the like or any other sensor that may be useful in determining orientation information. The position monitoring module 260 may also be configured to communicate data to be stored as a position history or location information. In this regard, for example, the position history may define a series of data points corresponding to positions of the chainsaw 100 at respective times. Various events or activities of the chainsaw 100 may therefore also be recorded in association with position history or location information provided by the position monitoring module 260. In an example embodiment, the measurement trigger 140 may be used to indicate a start point or reference point for initiation of movement tracking, and the feedback indicator 150 may receive information from the position monitoring module 260 to provide audible, visual and/or tactile feedback to the operator regarding the movement of the chainsaw 100 relative to the start point or reference point.

The user interface 230 may be in communication with the processing circuitry 210 to receive an indication of a user input at the user interface 230 and/or to provide an audible, visual, tactile or other output to the user. As such, the user interface 130 may include, for example, a display, one or more levers, switches, buttons or keys (e.g., function buttons), and/or other input/output mechanisms. In an example embodiment, the user interface 230 includes the measurement trigger 140 and the feedback indicator 150, which may include one or a plurality of lights, a display, a speaker, a tone generator, a vibration unit and/or the like.

The device interface 220 may include one or more interface mechanisms for enabling communication with other devices (e.g., sensors of the sensor network 240, the movement sensor circuitry 250 and/or other accessories or functional units of the chainsaw 100 or other power equipment on which an example embodiment may be employed). In some cases, the device interface 220 may be any means such as a device or circuitry embodied in either hardware, or a combination of hardware and software that is configured to receive and/or transmit data from/to sensors in communication with the processing circuitry 210 via internal communication systems of the chainsaw 100. In some cases, the device interface 220 may further include wireless communication equipment (e.g., a one way or two way radio) for at least communicating information from the chainsaw 100 to a network and, in the case of a two way radio, in some cases receiving information from a network.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the position monitoring module 260 (or any other components of the onboard circuitry 200) based on inputs received by the processing circuitry 210 responsive to operation of the chainsaw 100 and/or the operation of various ones of any functional units that may be associated therewith. As such, in some embodiments, the processor 212 (or the processing circuitry 210) may be said to cause each of the operations described in connection with the position monitoring module 260 in relation to operation the position monitoring module 260 relative to undertaking the corresponding functionalities associated therewith responsive to execution of instructions or algorithms configuring the processor 212 (or processing circuitry 210) accordingly.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative or additional capability, the memory 214 may include one or more databases that may store a variety of data sets responsive to input from the sensor network 240, the movement sensor circuitry 250, the position monitoring module 260, or any other functional units that may be associated with the chainsaw 100. Among the contents of the memory 214, applications may be stored for execution by the processor 212 in order to carry out the functionality associated with each respective application. In some cases, the applications may include instructions for recognition of various input signals related to designation of a reference position (or orientation) and then providing feedback relative to maintaining a certain position, orientation, line of movement and/or the like relative to the reference position as described herein. Additionally or alternatively, the applications may prescribe particular reporting paradigms or protocols for reporting of information from the chainsaw 100 to a network device using the device interface 220.

In an example embodiment, the measurement trigger 140 may be pressed by the operator to designate a reference point. In the context of chainsaw operation, the measurement trigger 140 may be pressed before, during or after a work piece (e.g., a log) is cut at a particular location. The position monitoring module 260 may note the reference point and then monitor data provided by the movement sensor circuitry 250 to determine when the chainsaw 100 has moved a predetermined distance (e.g., the distance corresponding to the desired length of the cut work piece). When the chainsaw 100 has moved the predetermined distance, the position monitoring module 260 may provide an input to the feedback indicator 150 to direct the feedback indicator 150 to indicate the same to the operator (e.g., via lighting of one or more lights, provision of a sound, or vibration).

In the context of the example above, the position monitoring module 260 may be configured to monitor the lateral movement of the chainsaw 100. Thus, in some embodiments, the position monitoring module 260 may be configured to monitor lateral acceleration (and/or velocity) so that the acceleration may be considered along with the time that the acceleration in the corresponding direction is detected to determine a distance. The distance traveled may continuously or periodically be determined based on the time over which a particular motion (as indicated by the acceleration and/or velocity) has been experienced. The distance traveled may be compared (by the position monitoring module 260) to a desired distance that may be known based on a current program setting or mode of operation. When the distance traveled is equal to the desired distance, the position monitoring module 260 may direct the feedback indicator 150 to indicate the same. Thus, the position monitoring module 260 may be configured to calculate or determine distance and/or direction of movement by employing one or several steps of integration using data indicative of physical movement of the device based on inertial data.

As such, in some embodiments, the position monitoring module 260 may not only activate the feedback indicator 150 when the desired distance is equal to the distance traveled. Instead, for example, the position monitoring module 260 may be configured to provide one or more warning indications to indicate either that the desired distance is close, or to indicate a degree of closeness to the desired distance. Thus, for example, the position monitoring module 260 may monitor an amount of reduction of distance between the desired distance and the distance traveled and provide for an increase in the frequency of the blinking of a light, an increase in tone frequency, increase in frequency of presenting sound bursts (e.g., beeps), increase in frequency of presenting tactile feedback pulses, and/or the like, as the distance traveled approaches the desired distance. Alternatively or additionally, one or more warning beeps, flashes, or mechanical pulses may be provided at one or more corresponding preset distances from the desired distance to warn the operator to slow down since the desired distance is approaching.

Figure 3:
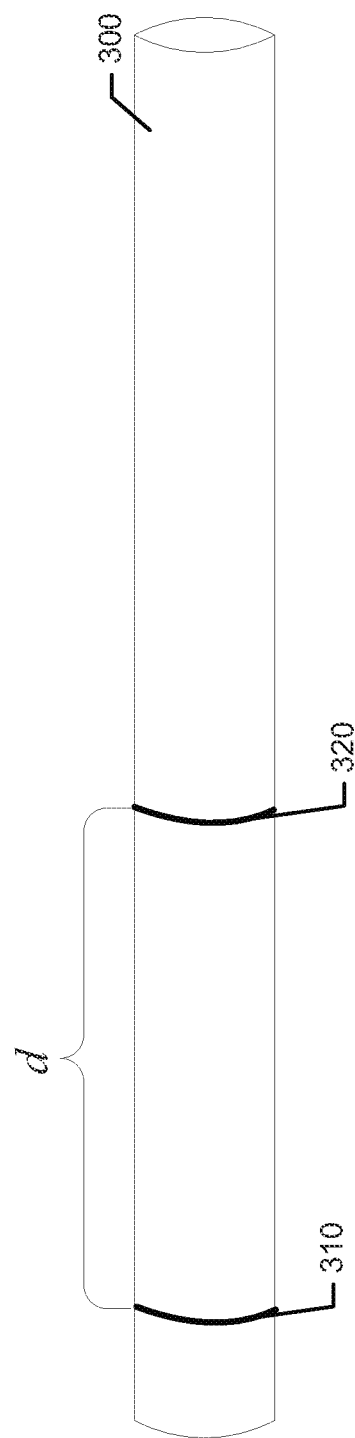
FIG. 3 illustrates a workpiece that can be cut to a predetermined length using an example embodiment.

Accordingly, as a preset distance between cuts is approached, the feedback indicator 150 may indicate proximity to the preset distance and/or when the preset distance is reached. The operator may then cut at the preset distance. The measurement trigger 140 may be pressed to create a new reference point for the next cut and/or to provide clearance for the prior reference point. In some embodiments, the preset distance may be provided according to a program stored in the device, or may be adjusted by the operator. FIG. 3 illustrates a workpiece 300 that can be cut to a predetermined length using an example embodiment. In this regard, a first cut 310 is made and the measurement trigger 140 may be used to mark the first cut 310 as a reference point. Thereafter, the operator may move the chainsaw laterally to the right along the length of the workpiece 300. When movement along the workpiece 300 by the predetermined length is detected, the feedback indicator 150 may inform the operator and the operator may perform a second cut 320. In FIG. 3, the distance, d, illustrates the predetermined length.

Although the first cut 310 is shown, it should be appreciated that the measurement trigger 140 could be actuated when the chainsaw is held proximate to an end of the workpiece 300 so that the first cut 310 could be the predetermined length, d, from the end of the workpiece 300. The second and subsequent cuts may then be made at desired intervals from the location of the first cut 310.

As an alternative to measuring distance based on time and speed/acceleration parameters, some example embodiments may be configured to employ the position monitoring module 260 to maintain a straight cutting line. For example, when the position monitoring module 260 is employed in connection with a trimmer that is to be used to trim a hedge to a consistent height, the position monitoring module 260 may be configured to warn of any acceleration or movement in a direction other than a desired direction. In the example where a constant hedge height is desired, movement in the lateral direction may be expected. However, movement in the vertical direction may be undesirable. Accordingly, responsive to setting a reference elevation (e.g., via the actuation of the measurement trigger 140), the position monitoring module 260 may be configured to sense movement in the vertical direction away from the reference elevation and provide feedback to the operator regarding the same. In one example, the position monitoring module 260 may provide a signal to cause the feedback indicator 150 to warn the operator when motion is detected in the vertical direction. In some cases, different feedback may be provided dependent upon whether the motion detected is tending toward a lower or higher elevation. Thus, the operator may continuously be guided during lateral movement as to whether the operator needs to tend upward or downward in order to maintain a straight line of movement in terms of elevation of the cutting performed by the trimmer. As an example, a tone or blink pattern may be provided and the tone or blink pattern may increase for elevation increases away from the desired elevation, and may decrease for elevation decreases away from the desired elevation. The feedback in this type of example may indicate a degree of error (and perhaps also a direction of the error) from a desired elevation. However, other paradigms for informing the operator may alternatively be employed.

In still other alternative embodiments, rather than measuring a distance or maintaining a particular elevation, the position monitoring module 260 could be employed to assist in relation to cutting, edging or trimming in a straight line regardless of elevation. Thus, for example, the position monitoring module 260 may be informed of a reference point (e.g., via the actuation of the measurement trigger 140) and may begin tracking motion of the device employing the position monitoring module 260 to ensure that acceleration in only one lateral direction is sensed. Any error or deviation from straight line motion that is sensed by the position monitoring module 260 may be communicated to the operator via the feedback indicator 150. In some embodiments, an initial straight line direction away from the reference point may be determined and any acceleration away from that initial straight line direction may be indicated by feedback aimed at minimizing deviation from the direction. However, in some embodiments, the operator may define two or more reference points and the position monitoring module 260 may determine a straight line between the reference points and provide guidance feedback via the feedback indicator 150 to direct the operator to minimize error relative to following the straight line between the reference points.

As can be appreciated from the description above, some embodiments may be enabled to provide measurement and guidance in combination to provide guidance relative to three dimensional activities. For example, a hedge could be trimmed using guidance to define discrete breaks at predetermined distances using measurement as described above, while front, back, top, and right and left edges of the hedge could also be precision trimmed using guidance as described above. Moreover, in some cases, the feedback provided via example embodiments may provide an autopilot type function where the feedback directs the operator to make movements to keep the device being utilized along a guided path. Furthermore, in some cases, the feedback signals could be converted into guidance signals to insert steering changes automatically to minimize error (e.g., on a riding lawn mower). Although the feedback signals may be provided in relatively simple ways (e.g., via sounds and/or lights), some embodiments may also employ more complex guidance mechanisms. For example, in some cases, a display may be provided as a part of the user interface 230, and the display may indicate actual distances traveled and/or shapes being formed on a head-up display. Thus, relatively robust guidance capabilities may be provided so that guidance may be provided for movements other than merely lateral movements. Thus, for example, guidance may be provided for cutting hedges or trimming trees to various desired shapes.

In some embodiments, the operator may be enabled to shift between modes via the user interface 230 (e.g., by using the measurement trigger 140 or another input device). Thus, in one mode, measurement along the lines described above may be accomplished. Meanwhile, in other modes, the position monitoring module 260 may be configured to perform guided cutting in vertical or horizontal planes. Angled cutting may also be possible in some modes. Accordingly, by shifting between modes, the operator may perform multiple types of precision cuts or other operations.

In an alternative embodiment, specific modes, guidance programs and/or the like may be provided to the position monitoring module 260 by wireless communication or by downloading programs from a portable memory device (e.g., a USB memory device). Thus, the preferred shape for which guidance is desired may be defined on a computer and transferred to the outdoor power equipment (e.g., chainsaw 100) that is employing an example embodiment. The computer may include programs for defining three dimensional designs so that the outdoor power equipment can be programmed to monitor movement over a plurality of directions of movement and provide feedback to indicate deviation from programmed shapes so that multi-directional guidance can be provided to achieve one, two or three dimensional shape realization. However, in some embodiments, one operator may use a device to perform precision cutting and the movements may be tracked by the position monitoring module 260 and stored therein to define a program. As such, a program may be defined based on the movements of that operator so that a guidance program can be provided to another operator of the same or a different device (e.g., by transferring the program to another device), or so that the same or a different operator can receive guidance to repeat a previously performed task on the same device.

In some embodiments, as discussed above, operator activity may be logged so that certain activities can be used as measurement triggers instead of requiring the operator to actually actuate a button or switch like the measurement trigger 140. Thus, for example, various patterns of activity may be correlated to certain actions and some such actions may define triggers that may form the basis of guidance and/or measurement functions as described herein. For example, the running of the chainsaw 100 at full throttle may generally indicate a cutting operation. Alternatively or additionally, the inertial movements associated with cutting may be detectable to indicate a cutting operation. Detection of chainsaw parameters such as these may indicate a trigger activity. Thus, for example, upon completion of a full throttle operation, lateral movement may be detected to determine when lateral movement of a predetermined distance has occurred to signal the operator to cut again. Each cutting operation may clear the prior reference point and/or trigger marking of a new reference point. Thus, measurement triggers may not necessarily only be provided by operator actuation of a button like the measurement trigger 140. Instead, in some cases, operational parameter measurement may be used to detect operational parametric triggers.

Figure 4:
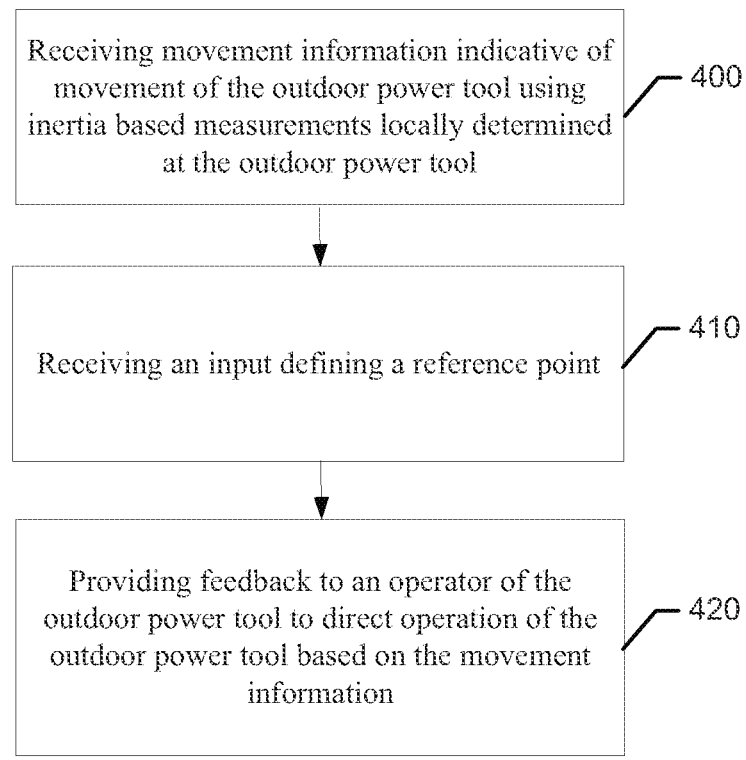
FIG. 4 illustrates a method of providing feedback for operation of an outdoor power tool according to an example embodiment.

In some cases, a method of providing feedback for enabling operation of an outdoor power tool with guidance and/or measurement provided using inertial measurement according to an example embodiment may be provided. FIG. 4 illustrates a block diagram of such a method. In some embodiments, the processing circuitry 210 (which may include a processor capable of executing instructions stored in a non-transitory computer readable medium/memory) may be configured to implement a control algorithm for the outdoor power tool according to the method.

In an example embodiment, the method may include receiving movement information indicative of movement of the outdoor power tool using inertia based measurements locally determined at the outdoor power tool at operation 400, receiving an input defining a reference point at operation 410, and providing feedback to an operator of the outdoor power tool to direct operation of the outdoor power tool based on the movement information at operation 420.

In some embodiments, the method may include additional, optional operations, and/or the operations described above may be modified or augmented. Some examples of modifications, optional operations and augmentations are described below. In this regard, for example, in some cases, (1) providing feedback to the operator may include providing audible feedback, tactile feedback or visual feedback to the operator. Additionally or alternatively, (2) providing feedback may include comparing the movement information to data associated with a stored program and providing feedback indicative of a difference between the movement information and the data associated with the stored program.

In some embodiments, either or both of (1) and (2) may be employed and providing feedback may include detecting lateral movement of the outdoor power tool toward a point a predetermined distance from the reference point based on the movement information, and providing an indication to the operator regarding proximity to the point. In an example embodiment, either or both of (1) and (2) may be employed and providing feedback may include detecting a change in elevation of the outdoor power tool relative to an elevation of the reference point based on the movement information, and providing an indication to the operator regarding the change in elevation. Additionally or alternatively, either or both of (1) and (2) may be employed and providing feedback may include providing a series of audible beeps or visual flashes that increase in frequency as deviation from a desired movement path increases. In an example embodiment, either or both of (1) and (2) may be employed and providing feedback may incldue providing a series of audible beeps or visual flashes that increase in frequency as proximity to a desired location decreases. Additionally or alternatively, either or both of (1) and (2) may be employed and providing feedback may include providing feedback to automatically guide steering of the outdoor power tool.

In an example embodiment, an outdoor power tool is provided. The outdoor power tool may include an engine, a working assembly that performs a cutting operation powered by the engine, movement sensor circuitry configured to at least determine movement information of the outdoor power tool using inertia based measurements locally determined at the outdoor power tool, and a position monitoring module including processing circuitry configured to receive the movement information and receive an input defining a reference point. The position monitoring module may be further configured to provide feedback to an operator of the outdoor power tool to direct operation of the outdoor power tool based on the movement information.

The outdoor power tool of some embodiments may include additional features that may be optionally added. For example, in some embodiments, (1) the tool may further include a feedback indicator disposed on a casing of the outdoor power tool to provide feedback to the operator. In such a tool, (2) the feedback indicator may include one or more lights to provide visual feedback. Additionally or alternatively, (3) the feedback indicator may include a speaker to provide audible feedback. Additionally or alternatively, (4) the feedback indicator may provide tactile feedback. In an example embodiment, (5) feedback is provided to the operator based on a comparison of the movement information to a stored program. In some cases, (6) the stored program is downloaded wirelessly to the outdoor power tool. Additionally or alternatively, (7) the stored program may be downloaded to the outdoor power tool via a removable memory device.

In some embodiments, any or all of (1) to (7) may be employed, and the engine may be gas or electrically powered. In some embodiments, any or all of (1) to (7) may be employed, and the feedback may be provided responsive to lateral movement of the outdoor power tool a predetermined distance from the reference point based on the movement information. In some embodiments, any or all of (1) to (7) may be employed, and actuation of a measurement trigger may indicate a location of the reference point. In such an example, the measurement trigger may be disposed on a casing of the outdoor power tool. Additionally or alternatively, any or all of (1) to (7) may be employed, and the feedback may be provided responsive to lateral movement of the outdoor power tool and the feedback is indicative of a change in elevation of the outdoor power tool relative to an elevation of the reference point based on the movement information. In an example embodiment, any or all of (1) to (7) may be employed, and the feedback may be provided responsive to movement of the outdoor power tool where the feedback is indicative of acceleration away from a straight line extending away from the reference point based on the movement information. In some embodiments, any or all of (1) to (7) may be employed, and the feedback may be provided responsive to lateral movement of the outdoor power tool toward a point located a predetermined distance from the reference point based on the movement information, and the feedback may be indicative of a proximity of the outdoor power tool to the point. In an example embodiment, any or all of (1) to (7) may be employed, and the feedback may be provided responsive to lateral movement of the outdoor power tool toward a point located a predetermined distance from the reference point based on the movement information, and the feedback may provide a series of audible beeps that increase in frequency as proximity of the outdoor power tool to the point decreases. In some embodiments, any or all of (1) to (7) may be employed, and the feedback may be provided responsive to movement of the outdoor power tool toward a point located a predetermined distance from the reference point based on the movement information, and the feedback may provide a series of visible flashes that increase in frequency as proximity of the outdoor power tool to the point decreases. In an example embodiment, any or all of (1) to (7) may be employed, and the outdoor power tool may be a chainsaw, a trimmer, an edger or a mower. In some embodiments, any or all of (1) to (7) may be employed, and the feedback may be provided to automatically guide steering of the outdoor power tool. In an example embodiment, any or all of (1) to (7) may be employed, and the feedback may be provided responsive to movement of the outdoor power tool in a plurality of directions such that the feedback compares the movement information in each of the directions to programmed instructions to provide feedback to the operator indicative of deviation from the programmed instructions. In some embodiments, any or all of (1) to (7) may be employed, and receiving the input defining the reference point may include detecting operational parameters indicative of a trigger operation. In some embodiments, any or all of (1) to (7) may be employed, and the position monitoring module may employ RTK-GPS.

Accordingly, some example embodiment may provide a robust system for providing guidance and/or accurate measurement to assist device users during device operation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An outdoor power tool comprising:
an engine;
a working assembly that performs a cutting operation powered by the engine;
movement sensor circuitry configured to at least determine movement information of the outdoor power tool using inertia based measurements locally determined at the outdoor power tool; and
a position monitoring module including processing circuitry configured to:
receive the movement information and receive an input from the outdoor power tool defining a reference point relative to an object to be cut, and
provide, based on the movement information, feedback to an operator of the outdoor power tool in response to movement of the outdoor power tool a predetermined distance from the reference point along the object to be cut,
wherein the object to be cut is a workpiece to be cut.

2. The outdoor power tool of claim 1, further comprising a feedback indicator disposed on a casing of the outdoor power tool to provide feedback to the operator.

3. The outdoor power tool of claim 2, wherein the feedback indicator includes one or more lights to provide visual feedback.

4. The outdoor power tool of claim 2, wherein the feedback indicator includes a speaker to provide audible feedback.

5. The outdoor power tool of claim 2, wherein the feedback indicator provides tactile feedback, the tactile feedback comprising mechanical pulses.

6. The outdoor power tool of claim 1, wherein the feedback is provided to the operator based on a comparison of the movement to a stored program.

7. The outdoor power tool of claim 6, wherein the stored program is downloaded wirelessly to the outdoor power tool or is downloaded to the outdoor power tool from a removable memory device.

8. The outdoor power tool of claim 1, wherein the engine is electrically powered or gas powered.

9. The outdoor power tool of claim 1, wherein the feedback is provided responsive to lateral movement of the outdoor power tool the predetermined distance from the reference point.

10. The outdoor power tool of claim 1, wherein actuation of a measurement trigger indicates a location of the reference point.

11. The outdoor power tool of claim 1, further comprising a measurement trigger disposed on a casing of the outdoor power tool, and wherein in response to an actuation of the measurement trigger, the position monitoring module is configured to receive an input defining the reference point.

12. The outdoor power tool of claim 1, wherein the feedback is provided responsive to lateral movement of the outdoor power tool and the feedback is indicative of a change in elevation of the outdoor power tool relative to an elevation of the reference point.

13. The outdoor power tool of claim 1, wherein the feedback is provided responsive to lateral movement of the outdoor power tool toward a point located the predetermined distance from the reference point, and
wherein the feedback is indicative of a proximity of the outdoor power tool to the point or the feedback provides a series of audible beeps that increase in frequency as proximity of the outdoor power tool to the point decreases.

14. The outdoor power tool of claim 1, wherein the feedback is provided responsive to the movement of the outdoor power tool toward a point located the predetermined distance from the reference point, and wherein the feedback provides a series of visible flashes that increase in frequency as proximity of the outdoor power tool to the point decreases.

15. The outdoor power tool of claim 1, wherein receiving the input defining the reference point comprises detecting operational parameters indicative of a trigger operation.

16. The outdoor power tool of claim 1, wherein the position monitoring module employs real time kinematic (RTK)-global position system (GPS) navigation.

* * * * *